US 12,316,986 B2

United States Patent
Wu

(10) Patent No.: US 12,316,986 B2
(45) Date of Patent: May 27, 2025

(54) CIRCUIT FOR PERFORMING OPTICAL IMAGE STABILIZATION BEFORE LENS SHADING CORRECTION

(71) Applicant: Apple Inc., Cupertino, CA (US)

(72) Inventor: Chihsin Wu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 98 days.

(21) Appl. No.: 18/112,808

(22) Filed: Feb. 22, 2023

(65) Prior Publication Data

US 2024/0284062 A1    Aug. 22, 2024

(51) Int. Cl.
   *H04N 25/61*    (2023.01)
   *G06T 3/4007*   (2024.01)
   *H04N 5/52*     (2006.01)

(52) U.S. Cl.
   CPC .......... *H04N 25/61* (2023.01); *G06T 3/4007* (2013.01); *H04N 5/52* (2013.01)

(58) Field of Classification Search
   CPC ......... H04N 25/61; H04N 5/52; G06T 3/4007
   See application file for complete search history.

(56) References Cited

U.S. PATENT DOCUMENTS

| | | | | |
|---|---|---|---|---|
| 9,025,057 | B1 * | 5/2015 | George | G06T 5/70 348/241 |
| 2008/0074522 | A1 * | 3/2008 | Hunter | H04N 25/615 348/E5.041 |
| 2009/0219419 | A1 * | 9/2009 | Kawasaka | G03B 7/20 348/E5.041 |
| 2011/0001854 | A1 | 1/2011 | Nguyen | |
| 2011/0091101 | A1 | 4/2011 | Cote et al. | |
| 2011/0141323 | A1 | 6/2011 | Hyun | |
| 2011/0187877 | A1 | 8/2011 | Muukki | |
| 2013/0321678 | A1 | 12/2013 | Cote et al. | |
| 2016/0021352 | A1 | 1/2016 | Rudoy | |
| 2017/0078596 | A1 | 3/2017 | Chesnokov et al. | |

(Continued)

FOREIGN PATENT DOCUMENTS

KR    20160011167 A    1/2016

OTHER PUBLICATIONS

International Search Report and Written Opinion directed to related International Application No. PCT/US2024/016712, mailed Jun. 5, 2024; 7 pages.

*Primary Examiner* — Twyler L Haskins
*Assistant Examiner* — Surafel Yilmakassaye
(74) *Attorney, Agent, or Firm* — Sterne, Kessler, Goldstein & Fox, P.L.L.C.

(57) ABSTRACT

An image processing circuit for performing optical image stabilization before lens shading correction. The image processing circuit determines, for each row of pixels in an image captured through an image sensor receiving light through a lens having an optical center with a first offset along a first direction and a second offset along a second direction orthogonal to the first direction, a first grid offset along the first direction using the first offset and a coordinate of that row of pixels along the second direction. The image processing circuit determines, for each row of pixels in the image, a second grid offset along the second direction using the second offset and the coordinate of that row of pixels along the second direction. The image processing circuit generates an adjusted grid for the pixels of the image using the first grid offset and the second grid offset.

20 Claims, 8 Drawing Sheets

---

OBTAIN, FOR A LENS OF A CAMERA DEVICE HAVING AN OPTICAL CENTER, A FIRST OFFSET FOR THE OPTICAL CENTER ALONG A FIRST DIRECTION AND SECOND OFFSET FOR THE OPTICAL CENTER ALONG A SECOND DIRECTION ORTHOGONAL TO THE FIRST DIRECTION
802

↓

DETERMINE, FOR EACH ROW OF PIXELS IN AN IMAGE, A FIRST GRID OFFSET ALONG THE FIRST DIRECTION USING THE FIRST OFFSET AND A COORDINATE OF THAT ROW OF PIXELS ALONG THE SECOND DIRECTION
804

↓

DETERMINE, FOR EACH ROW OF PIXELS IN THE IMAGE, A SECOND GRID OFFSET ALONG THE SECOND DIRECTION USING THE SECOND OFFSET AND THE COORDINATE OF THAT ROW OF PIXELS ALONG THE SECOND DIRECTION
806

↓

GENERATE AN ADJUSTED GRID FOR THE PIXELS OF THE IMAGE USING THE FIRST GRID OFFSET AND THE SECOND GRID OFFSET
808

(56) References Cited

U.S. PATENT DOCUMENTS

2019/0324268 A1 10/2019 Zhou et al.
2021/0321065 A1* 10/2021 Wu .................... H04N 25/611
2022/0263979 A1 8/2022 Hua et al.

* cited by examiner

OBTAIN, FOR A LENS OF A CAMERA DEVICE HAVING AN OPTICAL CENTER, A FIRST OFFSET FOR THE OPTICAL CENTER ALONG A FIRST DIRECTION AND SECOND OFFSET FOR THE OPTICAL CENTER ALONG A SECOND DIRECTION ORTHOGONAL TO THE FIRST DIRECTION
802

DETERMINE, FOR EACH ROW OF PIXELS IN AN IMAGE, A FIRST GRID OFFSET ALONG THE FIRST DIRECTION USING THE FIRST OFFSET AND A COORDINATE OF THAT ROW OF PIXELS ALONG THE SECOND DIRECTION
804

DETERMINE, FOR EACH ROW OF PIXELS IN THE IMAGE, A SECOND GRID OFFSET ALONG THE SECOND DIRECTION USING THE SECOND OFFSET AND THE COORDINATE OF THAT ROW OF PIXELS ALONG THE SECOND DIRECTION
806

GENERATE AN ADJUSTED GRID FOR THE PIXELS OF THE IMAGE USING THE FIRST GRID OFFSET AND THE SECOND GRID OFFSET
808

*FIG. 8*

CIRCUIT FOR PERFORMING OPTICAL IMAGE STABILIZATION BEFORE LENS SHADING CORRECTION

BACKGROUND

1. Field of the Disclosure

The present disclosure relates to a circuit for processing image data, and more specifically to a circuit for performing optical image stabilization.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to performing one or more image processing algorithms.

An image processing pipeline typically includes lens shading correction, which represents application of a gain per pixel to compensate for a dropoff in intensity roughly proportional to a distance from a lens optical center. However, a drifting can occur between the lens optical center and a center axis of an image sensor that captures light passing through the lens. This drifting can cause application of inappropriate gains for lens shading correction, thus resulting into lens shading correction shift and brightness flicker in a captured image frame.

SUMMARY

Embodiments relate to an image processing circuit for performing optical image stabilization before lens shading correction. The image processing circuit includes a first processor circuit, a second processor circuit, and a grid adjustment circuit coupled to the first and second processor circuits. The first processor circuit determines, for each row of pixels of an image captured through an image sensor receiving light through a lens having an optical center with a first offset along a first direction and a second offset along a second direction orthogonal to the first direction, a first grid offset along the first direction using the first offset and a coordinate of that row of pixels along the second direction. The second processor circuit determines, for each row of pixels of the image, a second grid offset along the second direction using the second offset and the coordinate of that row of pixels along the second direction. The grid adjustment circuit generates an adjusted grid for the pixels of the image using the first grid offset and the second grid offset.

BRIEF DESCRIPTION OF THE DRAWINGS

FIG. 8 is a flowchart illustrating a method of optical image stabilization performed before lens shading correction, according to one embodiment.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to a circuit for compensation of optical image stabilization (OIS) drift, which is applied before lens shading correction of image data. The OIS drift is a drifting between an optical center of a lens in a camera device and a center axis of an image sensor in the camera device. The compensation of OIS drift may be performed before lens shading correction of image data to mitigate lens shading correction shift and brightness flicker in a captured image frame. The optical center may be adjusted for each image frame by applying an appropriate grid offset as a function of a pixel row position. Grid offsets may be computed along both spatial dimensions (e.g., along x and y axes) for each row of pixels. After the grid offsets are applied to all rows of pixels, gain interpolation can be applied as a function of pixel locations (which is now adjusted by the grid offsets) for lens shading correction.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California. Other portable electronic devices, such as wearables, laptops or tablet computers, are optionally used. In some embodiments, the device is not a portable communication device, but is a desktop computer or other computing device that is not designed for portable use. In some embodiments, the disclosed electronic device may include a touch-sensitive surface (e.g., a touch screen display and/or a touchpad). An example electronic device described below in conjunction with Figure (FIG. 1 (e.g., device 100) may include a touch-sensitive surface for receiving user input. The electronic device may also include one or more other physical user-interface devices, such as a physical keyboard, a mouse and/or a joystick.

Figure 1:
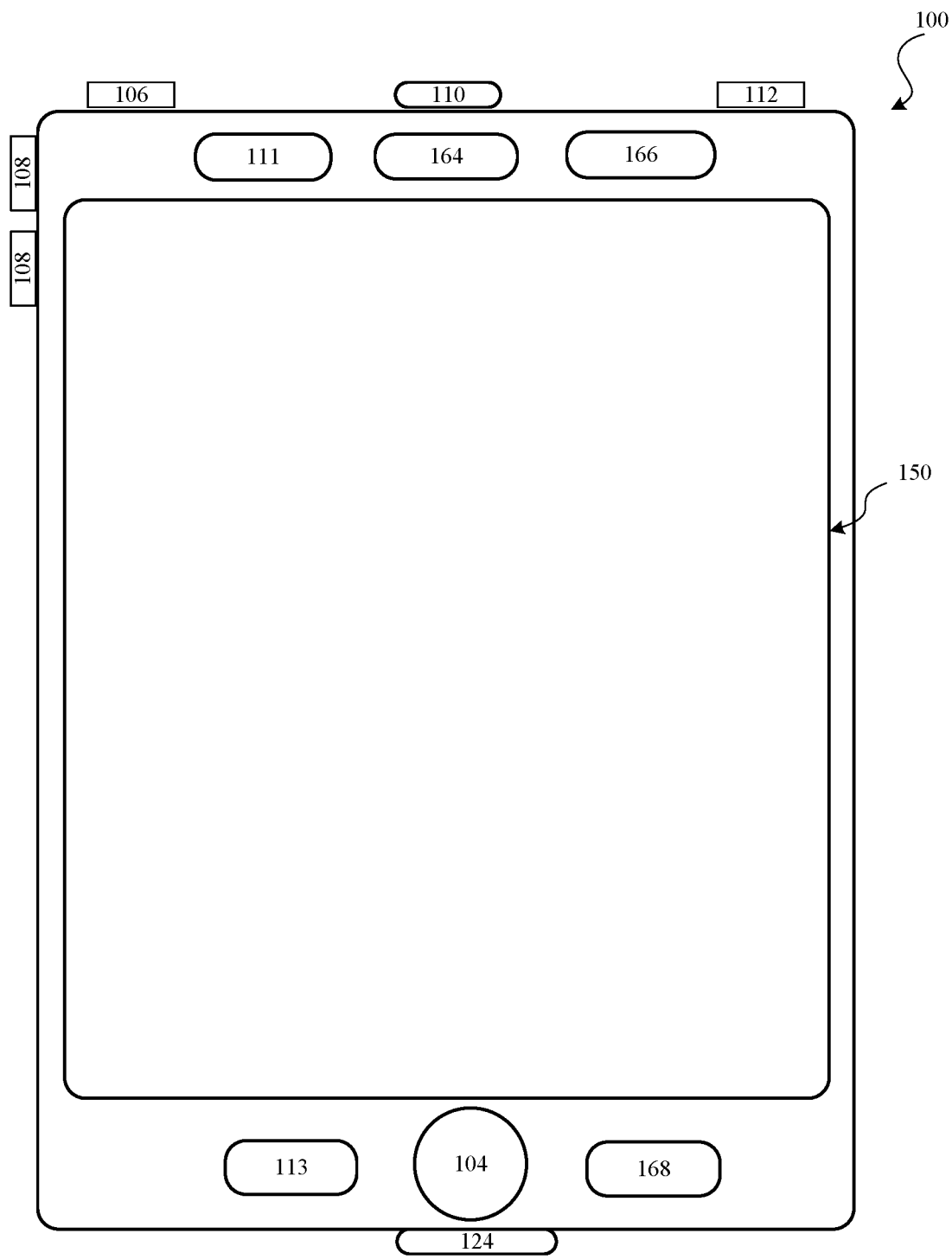
FIG. 1 is a high-level diagram of an electronic device, according to one embodiment.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. Additionally or alternatively, image sensors 164 may be associated with different lens configuration. For example, device 100 may include rear image sensors, one with a wide-angle lens and another with as a telephoto lens. Device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
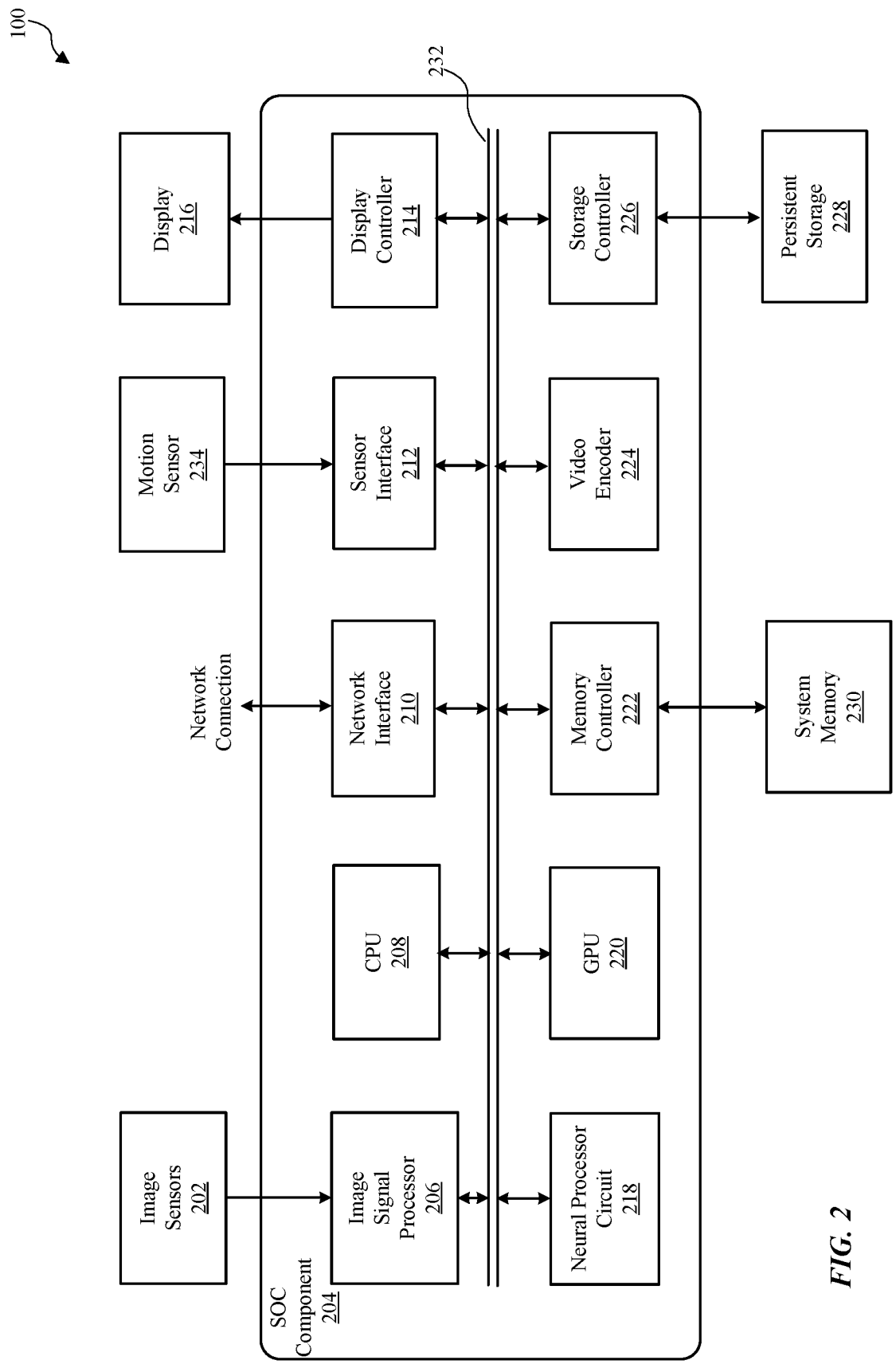
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensors 202, system-on-a chip (SOC) component 204, system memory 230, persistent storage (e.g., flash memory) 228, motion sensor 234, and display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

Image sensors 202 are components for capturing image data. Each of image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color filter array (CFA) pattern (hereinafter also referred to as "Bayer pattern"). Image sensor 202 may also include optical and mechanical components that assist image sensing components (e.g., pixels) to capture images. The optical and mechanical components may include an aperture, a lens system, and an actuator that controls the focal length of image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, a liquid crystal display (LCD) device or an organic light emitting diode (OLED) device. Based on data received from SOC component 204, display 216 may display various images, such as menus, selected operating parameters, images captured by image sensors 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor unit (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensors 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

GPU 220 is graphics processing circuitry for performing operations on graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from image sensors 202 and processed by ISP 206, and then sent to system memory 230 via bus 232 and memory controller 222. After the image data is stored in system memory 230, it may be accessed by video encoder 224 for encoding or by display 216 for displaying via bus 232.

In another example, image data is received from sources other than image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
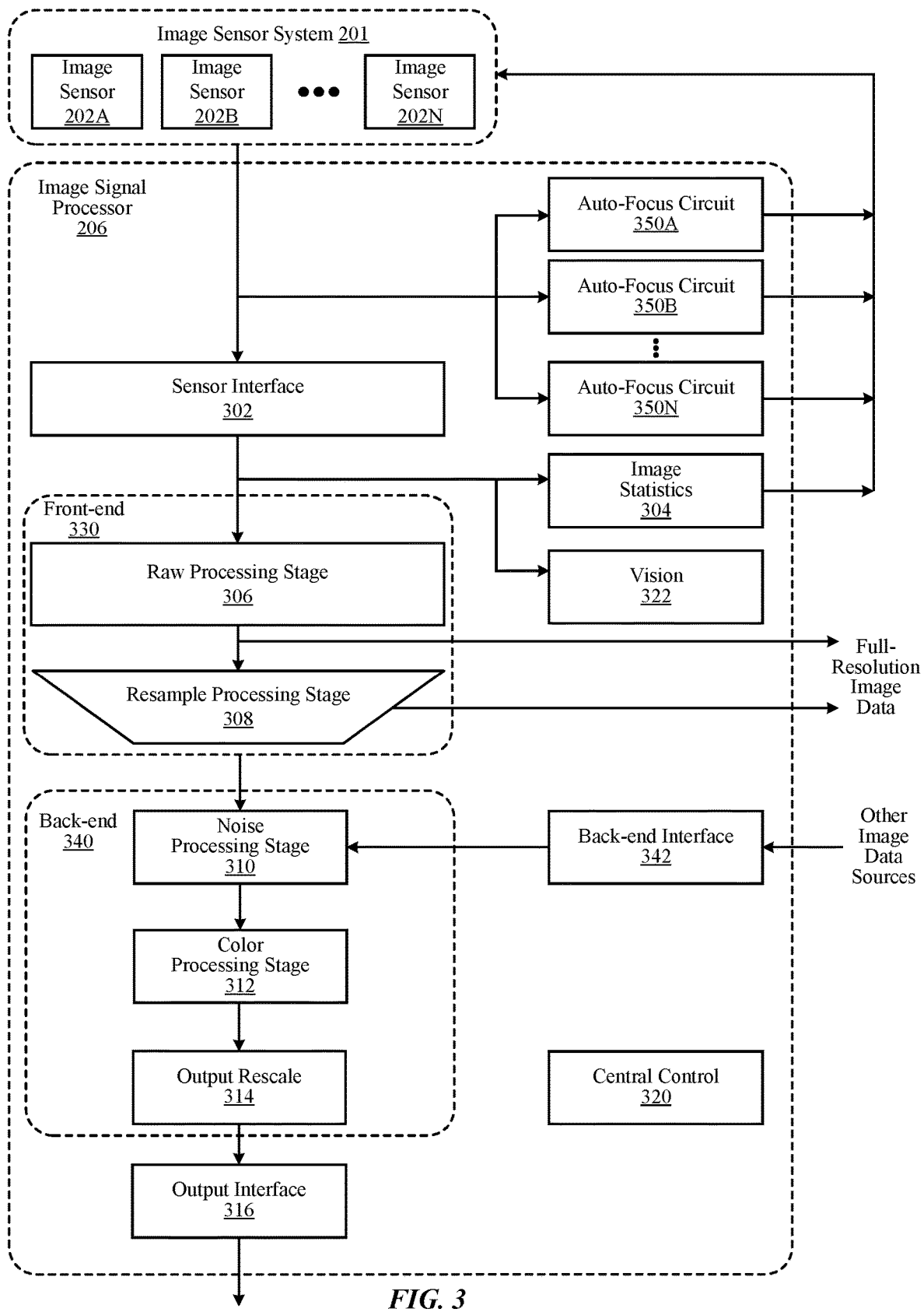
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. Image sensor system 201 may include one or more sub-systems that control image sensors 202 individually. In some cases, each image sensor 202 may operate independently while, in other cases, image sensors 202 may share some components. For example, in one embodiment, two or more image sensors 202 may share the same circuit board that controls the mechanical components of the image sensors (e.g., actuators that change the focal lengths of each image sensor). The image sensing components of image sensor 202 may include different types of image sensing components that may provide raw image data in different forms to ISP 206. For example, in one embodiment, the image sensing components may include multiple focus pixels that are used for auto-focusing and multiple image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if front-end pipeline stages 330 process two pixels per clock cycle, then raw processing stage 306 operations (e.g., black level compensation, highlight recovery and defective pixel correction) may process two pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., one pixel per clock cycle).

Raw image data captured by image sensors 202 may be transmitted to different components of ISP 206 in different manners. In one embodiment, raw image data corresponding to the focus pixels may be sent to auto-focus circuits 350 while raw image data corresponding to the image pixels may be sent to sensor interface 302. In another embodiment, raw image data corresponding to both types of pixels may simultaneously be sent to both auto-focus circuits 350 and sensor interface 302.

Auto-focus circuits 350 may include hardware circuit that analyzes raw image data to determine an appropriate focal length of each image sensor 202. In one embodiment, the raw image data may include data that is transmitted from image sensing pixels that specializes in image focusing. In another embodiment, raw image data from image capture pixels may also be used for auto-focusing purpose. Auto-focus circuit 350 may perform various image processing operations to generate data that determines the appropriate focal length. The image processing operations may include cropping, binning, image compensation, scaling to generate data that is used for auto-focusing purpose. The auto-focusing data generated by auto-focus circuits 350 may be fed back to image sensor system 201 to control the focal lengths of image sensors 202. For example, image sensor 202 may include a control circuit that analyzes the auto-focusing data to determine a command signal that is sent to an actuator associated with the lens system of image sensor 202 to change the focal length of image sensor 202. The data generated by auto-focus circuits 350 may also be sent to other components of ISP 206 for other image processing purposes. For example, some of the data may be sent to image statistics module 304 to determine information regarding auto-exposure.

Auto-focus circuits 350 may be individual circuits that are separate from other components such as image statistics module 304, sensor interface 302, front-end 330 and back-end 340. This allows ISP 206 to perform auto-focusing analysis independent of other image processing pipelines. For example, ISP 206 may analyze raw image data from image sensor 202A to adjust the focal length of image sensor 202A using auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of image sensor 202. Device 100 may perform auto focusing for different image sensors 202 even if one or more image sensors 202 are not in active use. This allows a seamless transition between two image sensors 202 when device 100 switches from one image sensor 202 to another. For example, in one embodiment, device 100 may include a wide-angle camera and a telephoto camera as a dual back camera system for photo and image processing. Device 100 may display images captured by one of the dual cameras and may switch between the two cameras from time to time. The displayed images may seamless transition from image data captured by one image sensor 202 to image data captured by another image sensor 202 without waiting for second image sensor 202 to adjust its focal length because two or more auto-focus circuits 350 may continuously provide auto-focus data to image sensor system 201.

Raw image data captured by different image sensors 202 may also be transmitted to sensor interface 302. Sensor interface 302 receives raw image data from image sensors 202 and processes the raw image data into an image data processable by other stages in the pipeline. Sensor interface 302 may perform various preprocessing operations, such as image cropping, binning or scaling to reduce image data size. In some embodiments, pixels are sent from image sensors 202 to sensor interface 302 in raster order (e.g., horizontally, line by line). The subsequent processes in the pipeline may also be performed in raster order and the result may also be output in raster order. Although only a single image sensor system 201 and a single sensor interface 302 are illustrated in FIG. 3, when more than one image sensor system is provided in device 100, a corresponding number of sensor interfaces may be provided in ISP 206 to process raw image data from each image sensor system.

Front-end pipeline stages 330 process image data in raw or full-color domains. Front-end pipeline stages 330 may include, but are not limited to, raw processing stage 306 and resample processing stage 308. A raw image data may be in a Bayer raw image format, for example. In the Bayer raw image format, pixel data with values specific to a particular color (instead of all colors) is provided in each pixel. In an image capturing sensor, image data is typically provided in the Bayer pattern. Raw processing stage 306 may process image data in the Bayer raw image format.

The operations performed by raw processing stage 306 include, but are not limited, sensor linearization, black level compensation, fixed pattern noise reduction, defective pixel correction, raw noise filtering, lens shading correction, white balance gain, highlight recovery, and chromatic aberration recovery (or correction). Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in the Bayer pattern).

Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in the Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, resample processing stage 308 converts RGB format into YCbCr format for further processing. In another embodiment, resample processing state 308 concerts RBD format into RGB format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (auto white balance (AWB), auto exposure (AE), histograms (e.g., 2D color or component) and any other image data information may be collected or tracked. In some embodiments, certain pixels' values, or areas of pixel values may be excluded from collections of certain statistics data when preceding operations identify clipped pixels. Although only a single statistics module 304 is illustrated in FIG. 3, multiple image statistics modules may be included in ISP 206. For example, each image sensor 202 may correspond to an individual image statistics module 304. In such embodiments, each statistic module may be programmed by central control module 320 to collect different information for the same or different image data.

Vision module 322 performs various operations to facilitate computer vision operations at CPU 208 such as facial detection in image data. Vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of image and a kernel.

Back-end interface 342 receives image data from other image sources than image sensor 202 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (e.g., no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame and thus the reference frame is not spatially filtered.

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by central control module 320) may be bilinearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three-dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, the output rescale module 314 may implement a table of piecewise perspective transforms encoded as digital difference analyzer (DDA) steppers to perform a per-pixel perspective transformation between an input image data and output image data in order to correct artifacts and motion caused by sensor motion during the capture of the image frame. Output rescale may provide image data via output interface 316 to various other components of device 100, as discussed above in relation to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Optical Compensation Circuit

Figure 4:
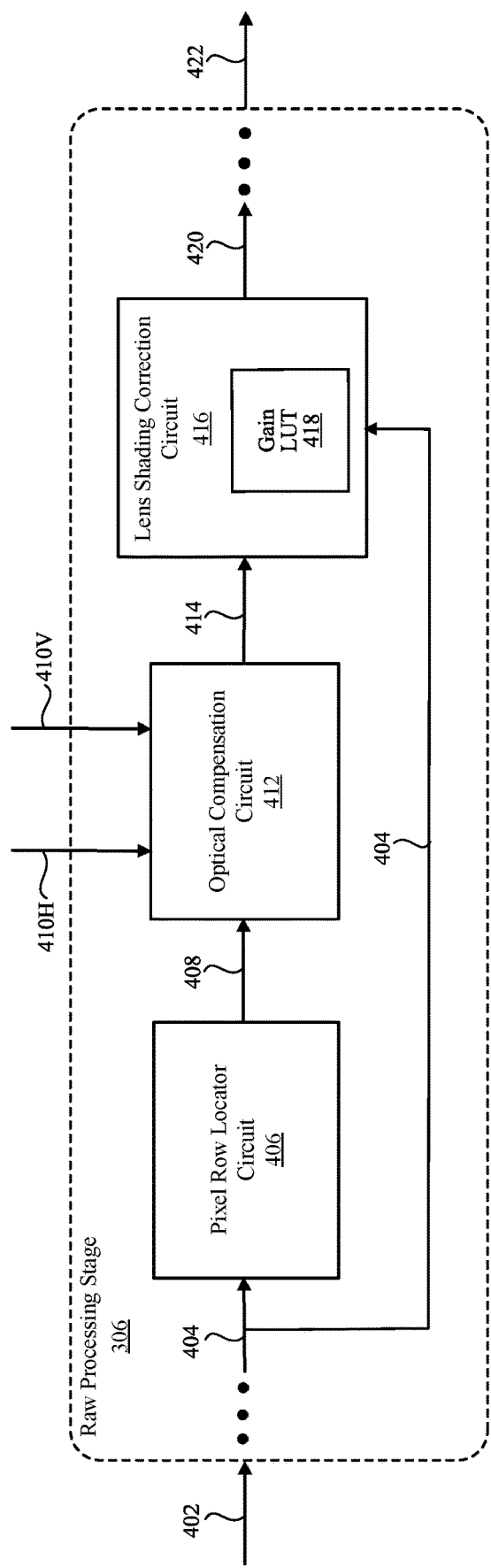
FIG. 4 is a block diagram illustrating a raw processing stage with an optical compensation circuit coupled to a lens shading correction circuit, according to one embodiment.

FIG. 4 is a block diagram illustrating raw processing stage 306 with an optical compensation circuit 412 for compensation of optical image stabilization drift performed before lens shading correction, according to one embodiment. A portion of raw processing stage 306 shown in FIG. 4 may further include a pixel row locator circuit 406 coupled to an input of optical compensation circuit 412, and a lens shading correction circuit 416 coupled to an output of optical compensation circuit 412. Raw processing stage 306 includes additional components not shown in FIG. 4. Moreover, some components of raw processing stage 306 described in relation to FIG. 4 may be embodied in various combinations of hardware, firmware, or software.

Raw image data 402 (e.g., in Bayer raw image format or in Quadra image format) may be passed onto raw processing stage 306, e.g., from sensor interface 302. Raw image data 402 may be captured through at least one image sensor 202 receiving light through a corresponding lens. Raw image data 402 may be processed within raw processing stage 306 to generate a raw image 404 in the form of two-dimensional array of pixels organized into multiple rows of pixels. Pixels of raw image 404 may be passed into pixel locator circuit 406 in raster order (e.g., horizontally, line by line or row by row). Pixel row locator circuit 406 may determine a coordinate 408 (e.g., a row number) for pixels in each row (or line) of raw image 404. Information about coordinate 408 for pixels in each row of raw image 404 may be passed onto optical compensation circuit 412.

Optical compensation circuit 412 may generate an adjusted grid for the pixels in raw image 404 for lens shading correction circuit 416. Optical compensation circuit 412 may obtain (e.g., from image sensor 202) information about an offset 410H for a lens optical center along a first direction (e.g., along horizontal direction or along x axis) and an offset 410V for the lens optical center along a second direction orthogonal to the first direction (e.g., along vertical direction or along y axis). Offsets 410H and 410V may be updated for each image frame captured by image sensor 202. Optical compensation circuit 412 may generate coordinates 414 of the adjusted grid for each pixel in raw image 404 using offset 410H, offset 410V and coordinate 408 obtained from pixel row locator circuit 406. Information about coordinates 414 of the adjusted grid for each pixel in raw image 404 may be passed onto lens shading correction circuit 416.

Lens shading correction circuit 416 may perform lens shading correction processing for each pixel in raw image 404 using information about coordinates 414 of the adjusted grid for each pixel in raw image 404. Lens shading correction circuit 416 may include a gain look-up table (LUT) 418 with a list of gain values. Lens shading correction circuit 416 may determine a gain value for each pixel by interpolating a value from gain LUT 418 in accordance with an interpolation function (e.g., bilinear interpolation function) and coordinates 414 of the adjusted grid for each pixel obtained from optical compensation circuit 412. Lens shading correction circuit 416 may apply the gain value to at least one color component of each pixel in raw image 404 to obtain a version of raw image 420 corrected for lens shading. One or more additional components of raw processing stage 306 (not shown in FIG. 4) may process version of raw image 420 to generate a final raw image 422 that is passed onto, e.g., resample processing stage 308 for further processing.

Figure 5:
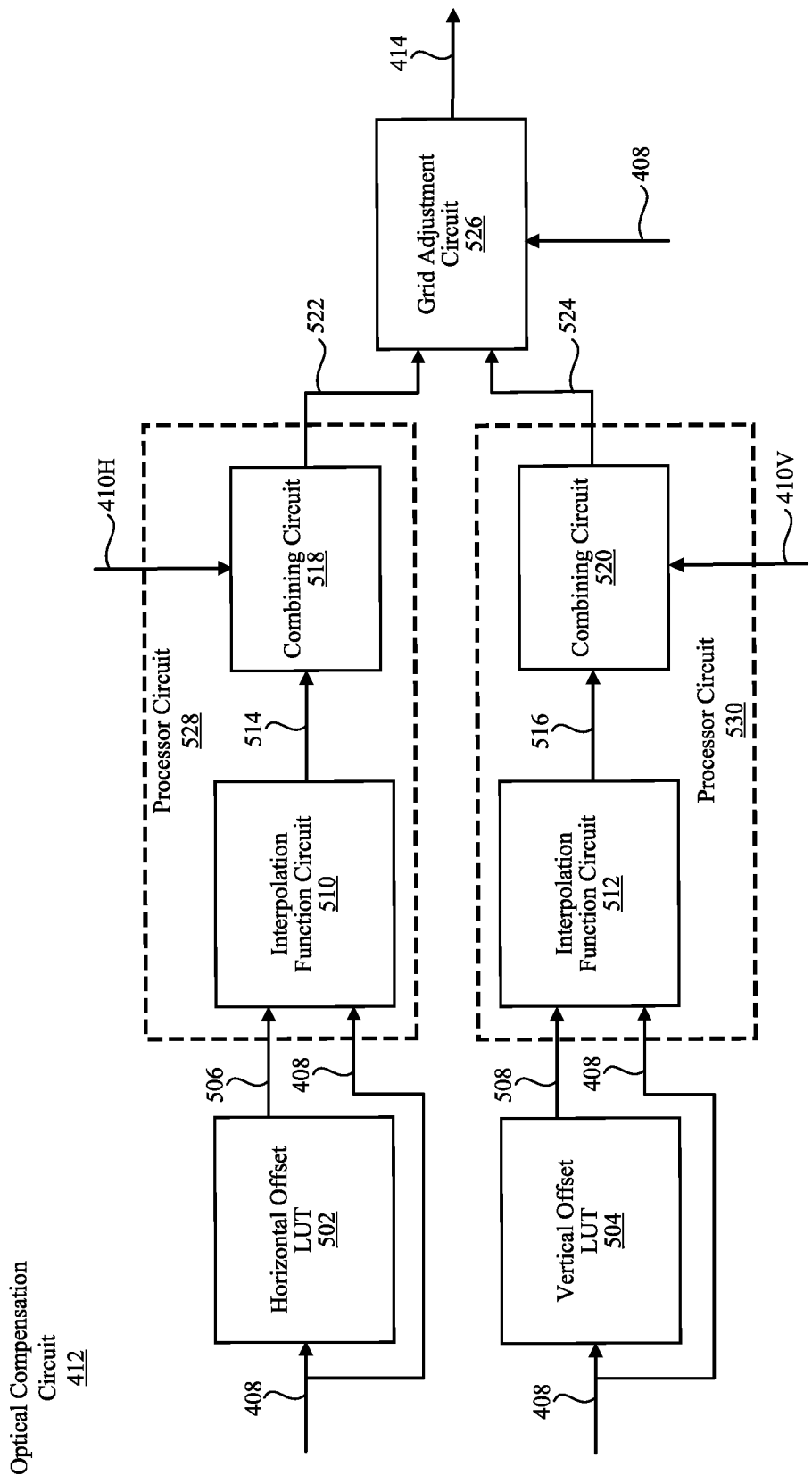
FIG. 5 is a block diagram illustrating a detailed view of the optical compensation circuit in FIG. 4, according to one embodiment.

FIG. 5 is a block diagram illustrating a detailed view of optical compensation circuit 412, according to one embodiment. Optical compensation circuit 412 may include a horizontal offset LUT 502, a processor circuit 528 coupled to horizontal offset LUT 502, a vertical offset LUT 504, a processor circuit 530 coupled to vertical offset LUT 504, and a grid adjustment circuit 526 coupled to outputs of processor circuits 528, 530. Optical compensation circuit 412 may include more or fewer components than what is shown in FIG. 5. Moreover, the various components of optical compensation circuit 412 described in relation to FIG. 5 may be embodied in various combinations of hardware, firmware, or software.

Horizontal offset LUT 502 may output a horizontal offset value 506 based on coordinate 408 (e.g., row number) for a current row of pixels in raw image 404, where coordinate 408 represents an input entry of horizontal offset LUT 502. Horizontal offset LUT 502 may include a predetermined list of horizontal offset values, e.g., a list of 9 horizontal offset values. The list of horizontal offset values in horizontal offset LUT 502 may be updated for each image frame captured by image sensor 202. Horizontal offset value 506 output by horizontal offset LUT 502 along with coordinate 408 (e.g., current row number) may be passed onto processor circuit 528.

Processor circuit 528 may determine, for each row of pixels in raw image 404, a grid offset 522 along the first direction (e.g., along horizontal direction or along x axis) using information about offset 410H, horizontal offset value 506 and coordinate 408 (e.g., current row number). Processor circuit 528 may include an interpolation function circuit 510 and a combining circuit 518 coupled to an output of interpolation function circuit 510. Interpolation function circuit 510 may determine an interpolation value 514 by interpolating horizontal offset value 506 in accordance with an interpolation function of interpolation function circuit 510 (e.g., bilinear interpolation function) based on coordinate 408 (e.g., current row number). Interpolation value 514 determined by interpolation function circuit 510 may be passed onto combining circuit 518. Combining circuit 518 may determine grid offset 522 along the first direction by combining interpolation value 514 and offset 410H. For example, combining circuit 518 may determine grid offset 522 along the first direction as a sum of interpolation value 514 and offset 410H. Information about grid offset 522 along the first direction determined by processor circuit 528 may be passed onto grid adjustment circuit 526.

Vertical offset LUT 504 may output a vertical offset value 508 based on coordinate 408 (e.g., row number) for a current row of pixels in raw image 404, where coordinate 408 represents an input entry of horizontal offset LUT 504. Vertical offset LUT 504 may include a predetermined list of vertical offset values, e.g., a list of 9 vertical offset values. The list of vertical offset values in vertical offset LUT 504 may be updated for each image frame captured by image sensor 202. Vertical offset value 508 output by vertical offset LUT 504 along with coordinate 408 (e.g., current row number) may be passed onto processor circuit 530.

Processor circuit 530 may determine, for each row of pixels in raw image 404, a grid offset 524 along the second direction (e.g., along vertical direction or along y axis) using information about offset 410V, vertical offset value 508 and coordinate 408 (e.g., current row number). Processor circuit 530 may include an interpolation function circuit 512 and a combining circuit 520 coupled to an output of interpolation function circuit 512. Interpolation function circuit 512 may determine an interpolation value 516 by interpolating vertical offset value 508 in accordance with an interpolation function of interpolation function circuit 512 (e.g., bilinear interpolation function) based on coordinate 408 (e.g., current row number). Interpolation value 516 determined by interpolation function circuit 512 may be passed onto combining circuit 520. Combining circuit 520 may determine grid offset 524 along the second direction by combining interpolation value 516 and offset 410V. For example, combining circuit 520 may determine grid offset 524 along the second direction as a sum of interpolation value 516 and offset 410V. Information about grid offset 524 along the second direction determined by processor circuit 530 may be passed onto grid adjustment circuit 526.

Grid adjustment circuit 526 may determine coordinates 414 of the adjusted grid for each pixel in raw image 404 using information about grid offset 522 along the first direction and grid offset 524 along the second direction. Grid adjustment circuit 526 may apply grid offset 522 along the first direction and grid offset 524 along the second direction to at least one pixel or a group of pixels (e.g., each pixel) in each row of raw image 404 to generate coordinates 414 of the adjusted grid for the pixels in raw image 404. Grid adjustment circuit 526 may further adjust grid offset 524 along the second direction by scaling grid offset 524 by a scaling factor (e.g., different than 1) that depends on coordinate 408 of a corresponding row of pixels (e.g., current row number) along the second direction (e.g., along vertical direction or y axis). Alternatively, the scaling factor may not depend on coordinate 408 and may be set to "1" for each row of pixels. In one or more embodiments, some or all of the functionalities of grid adjustment circuit 526 can be part of lens shading correction circuit 416.

Figure 6:
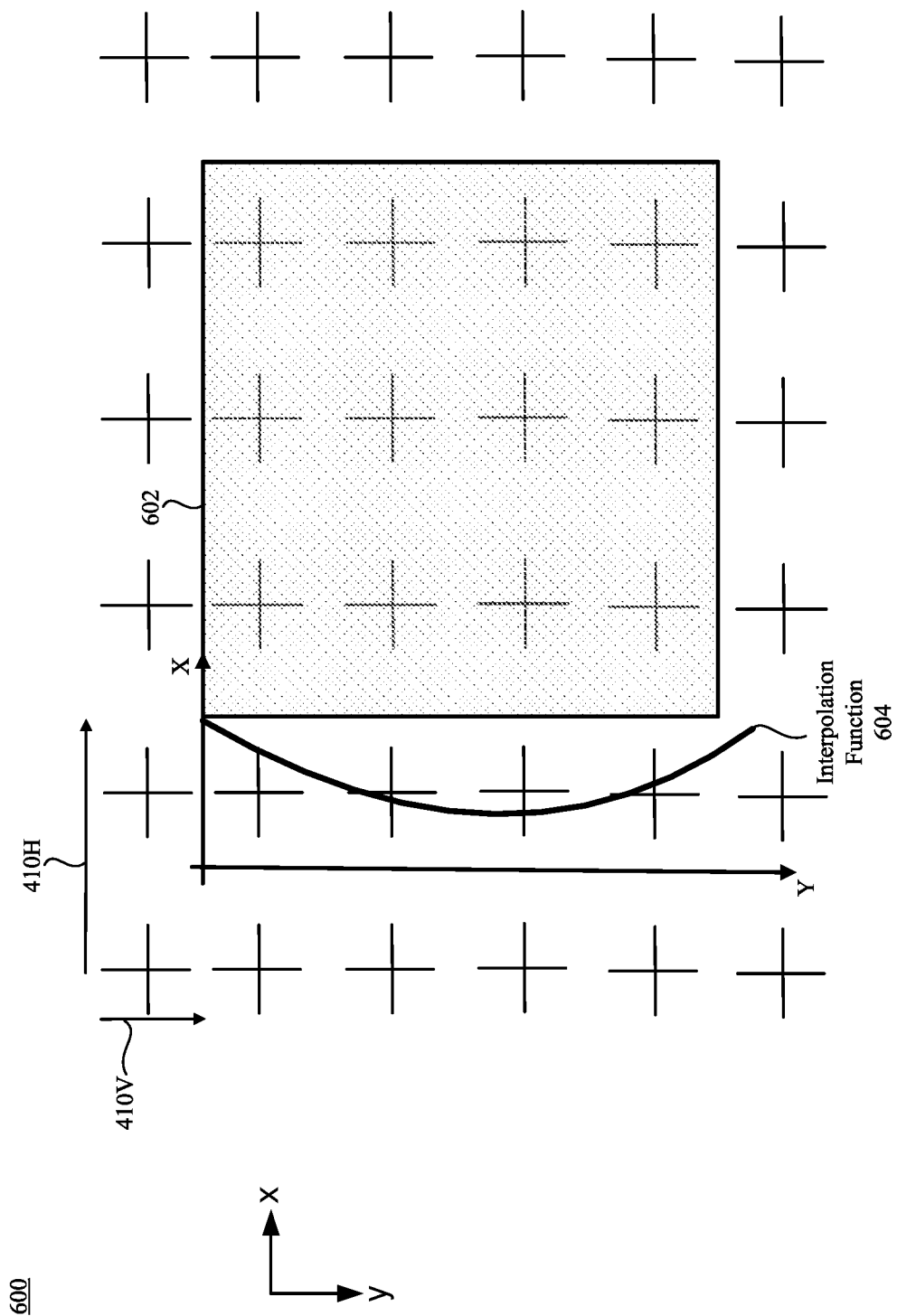
FIG. 6 is a conceptual diagram illustrating an optical image stabilization compensation performed by the optical compensation circuit in FIG. 4, according to one embodiment.

FIG. 6 is a conceptual diagram 600 illustrating an optical image stabilization compensation performed by optical compensation circuit 412, according to one embodiment. The diagram 600 shows an example image frame 602 overlaid on a two-dimensional grid. Image frame 602 may correspond to raw image 404. An upper left corner of image frame 602 (e.g., a first pixel in a first row in image frame 602) has offset 410H along the first direction (e.g., along horizontal direction or along x axis) and offset 410V along the second direction (e.g., along horizontal direction or along x axis) relative to a center axis of image sensor 202. Offset 410H and offset 410V may be updated for each image frame. A plot 604 may represent an interpolation function (e.g., bilinear interpolation function) of interpolation function circuit 510 and/or interpolation function circuit 512 in FIG. 5. It can be observed from FIG. 6, that an interpolation value defined by interpolation function 604 (e.g., interpolation value 514 and interpolation value 516 in FIG. 5) depends on a vertical coordinate (e.g., coordinate along y axis) of a pixel row in image frame 602 that is currently being processed (e.g., coordinate 408 in FIG. 5).

Figure 7:
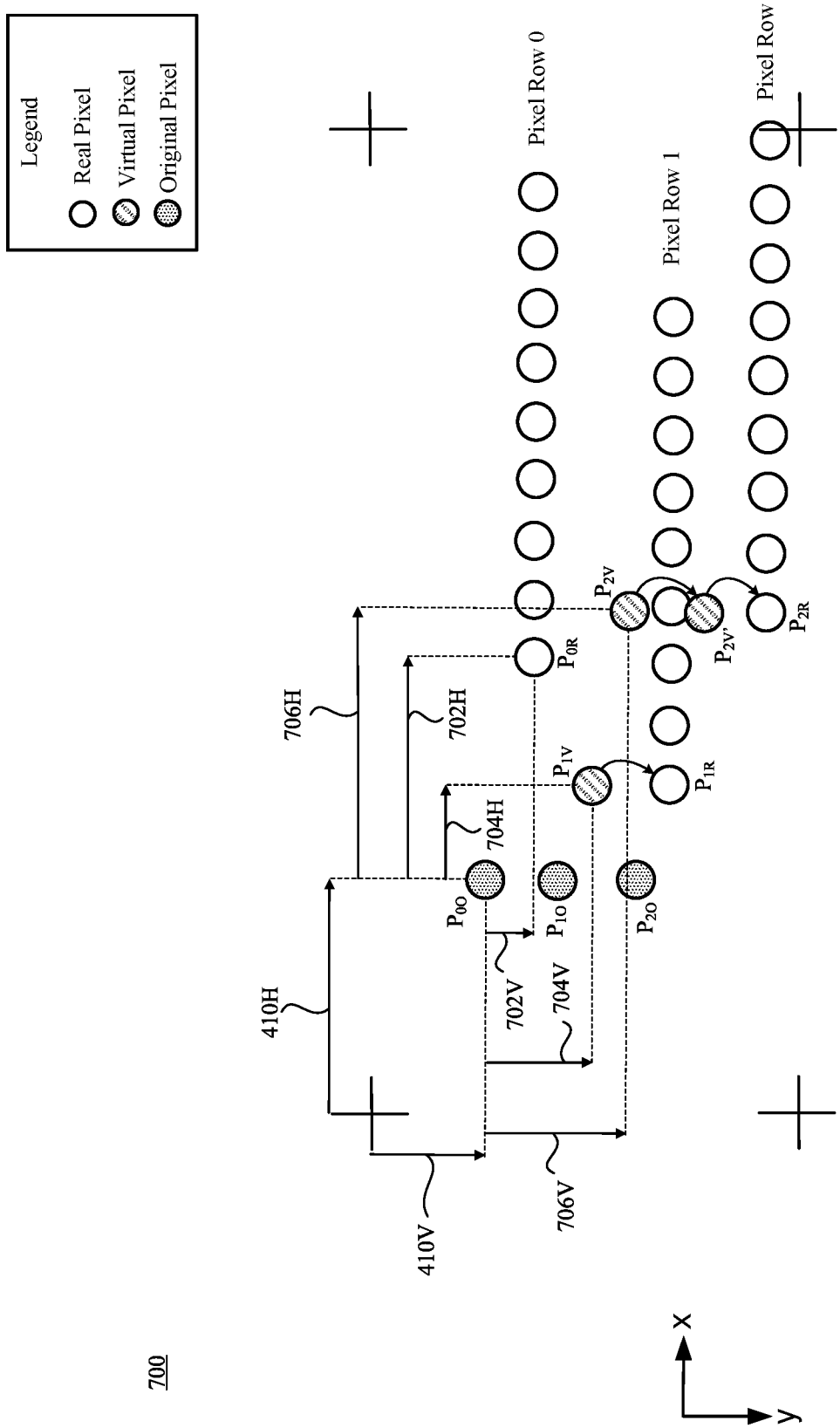
FIG. 7 is a conceptual diagram illustrating grid adjustment for three pixel rows as part of optical image stabilization compensation performed by the optical compensation circuit in FIG. 4, according to one embodiment.

FIG. 7 is a conceptual diagram 700 illustrating grid adjustment for three pixel rows as part of optical image stabilization compensation performed by optical compensation circuit 412, according to one embodiment. An original pixel $P_{0O}$ of a pixel row 0 (e.g., the left-most pixel in the pixel row 0) may have offset 410H along with the first direction (e.g., along horizontal direction or along x axis) and offset 410V along the second direction (e.g., along vertical direction or along y axis). A grid location of the original pixel $P_{0O}$ may be adjusted into a grid location of a real pixel $P_{0R}$ by applying a grid offset 702H along the first direction (e.g., along horizontal direction or along x axis) and a grid offset 702V along the second direction (e.g., along vertical direction or along y axis). Grid offsets 702H and 702V may be determined by adding corresponding offsets 410H, 410V to corresponding interpolation values (e.g., interpolation values 514, 516 in FIG. 5) that are function of a vertical coordinate of the pixel row 0 (e.g., coordinate 408 in FIG. 5). Grid offsets 702H and 702V may correspond to grid offsets 522 and 524, respectively. Grid locations for other pixels in the pixel row 0 may be obtained based on the grid location of the real pixel $P_{0R}$.

A grid location of an original pixel $P_{1O}$ of a pixel row 1 (e.g., the left-most pixel in the pixel row 1) may be first adjusted into a grid location of a virtual pixel $P_{1V}$ by applying a grid offset 704H along the first direction (e.g., along horizontal direction or along x axis) and a grid offset 704V along the second direction (e.g., along vertical direction or along y axis). Grid offsets 704H and 704V may be determined by adding corresponding offsets 410H, 410V to corresponding interpolation values (e.g., interpolation values 514, 516 in FIG. 5) that are function of a vertical coordinate of the pixel row 1 (e.g., coordinate 408 in FIG. 5). Grid offsets 704H and 704V may correspond to grid offsets 522 and 524, respectively. The grid location of the virtual pixel $P_{1V}$ may be further adjusted into a grid location of a real pixel $P_{1R}$ by scaling grid offset 704V by a scaling factor that depends on the vertical coordinate of the pixel row 1 (e.g., coordinate 408 in FIG. 5). It should be noted that the scaling factor may be equal to zero for pixels in the pixel row 0. Grid locations for other pixels in the pixel row 1 may be obtained based on the grid location of the real pixel $P_{1R}$.

A grid location of an original pixel $P_{2O}$ of a pixel row 2 (e.g., the left-most pixel in the pixel row 2) may be first adjusted into a grid location of a virtual pixel $P_{2V}$ by applying a grid offset 706H along the first direction (e.g., along horizontal direction or along x axis) and a grid offset 706V along the second direction (e.g., along vertical direction or along y axis). Grid offsets 706H and 706V may be determined by adding corresponding offsets 410H, 410V to corresponding interpolation values (e.g., interpolation values 514, 516 in FIG. 5) that are function of a vertical coordinate of the pixel row 2 (e.g., coordinate 408 in FIG. 5). Grid offsets 706H and 706V may correspond to grid offsets 522 and 524, respectively. The grid location of the virtual pixel $P_{2V}$ may be then adjusted into a grid location of a real pixel $P_{2R}$ by scaling grid offset 706V by a scaling factor that depends on the vertical coordinate of the pixel row 2 (e.g., coordinate 408 in FIG. 5). As the scaling factor for the pixel row 2 is greater than the scaling factor for the pixel row 1, the scaling process for the pixel row 2 is illustrated in FIG. 7 as a two-step process. The grid location of the virtual pixel $P_{2V}$ may be first adjusted into a grid location of a virtual pixel $P_{2V'}$ by scaling grid offset 706V by the scaling factor for the pixel row 1, and then the grid location of a virtual pixel $P_{2V'}$ is adjusted into the grid location of the real pixel $P_{2R}$ by further scaling by a remaining scaling factor that depends on the vertical coordinate of the pixel row 2. Grid locations for other pixels in the pixel row 2 may be obtained based on the grid location of the real pixel $P_{2R}$.

Example Process of Optical Image Stabilization for Lens Shading Correction

FIG. 8 is a flowchart illustrating a method of optical image stabilization by an image processor (e.g., ISP 206) performed before lens shading correction, according to one embodiment. The image processor may process an image having multiple pixels organized in a series of rows, and the image was captured through an image sensor receiving light through a lens. The image processor obtains 802 a first offset for an optical center of the lens along a first direction and a second offset for the optical center along a second direction orthogonal to the first direction.

The image processor determines 804, for each row of pixels of the image, a first grid offset along the first direction using the first offset and a coordinate of that row of pixels along the second direction. The image processor may determine the first grid offset along the first direction as a sum of the first offset and a first interpolation value that is a function of the coordinate of that row of pixels along the second direction. The image processor may determine the first interpolation value by interpolating a corresponding value from a look-up table in accordance with an interpolation function and the coordinate of that row of pixels along the second direction. The interpolation function may be, e.g., a bilinear interpolation function.

The image processor determines 806, for each row of pixels of the image, a second grid offset along the second direction using the second offset and the coordinate of that row of pixels along the second direction. The image processor may determine the second grid offset along the second direction as a sum of the second offset and a second interpolation value that is a function of the coordinate of that row of pixels along the second direction. The image processor may determine the second interpolation value by interpolating a corresponding value from a look-up table in accordance with an interpolation function and the coordinate of that row of pixels along the second direction. The image processor may adjust the second grid offset by scaling the second grid offset by a scaling factor that depends on a number of that row of pixels along the second direction.

The image processor generates 808 an adjusted grid for the pixels of the image using the first grid offset and the second grid offset. The image processor may apply the first grid offset and the second grid offset to at least one pixel in each row of pixels in the image to generate the adjusted grid for the pixels of the image. The image processor may perform lens shading correction processing of the pixels in the image using a gain interpolation as a function of the adjusted grid. The image processor may determine a gain value for each pixel in the image by interpolating a value from a gain look-up table in accordance with an interpolation function and coordinates of that pixel updated with the first and second grid offsets. The image processor may apply the gain value to at least one color component of that pixel to obtain a version of the image corrected for lens shading.

Embodiments of the process as described above with reference to FIG. 8 are merely illustrative. Moreover, sequence of the process may be modified or omitted.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An image processing circuit comprising:
   a first processor circuit configured to determine, for each row of a plurality of rows of a plurality of pixels of an image captured through an image sensor receiving light through a lens having an optical center with a first offset along a first direction and a second offset along a second direction orthogonal to the first direction, a first grid offset along the first direction based on the first offset and a coordinate of that row of pixels along the second direction;
   a second processor circuit configured to determine, for each row of the plurality of rows of the image, a second grid offset along the second direction based on the second offset and the coordinate of that row of pixels along the second direction; and
   a grid adjustment circuit configured to:
      scale the second grid offset; and
      generate an adjusted grid for the plurality of pixels based on the first grid offset and the scaled second grid offset.

2. The image processing circuit of claim 1, wherein the grid adjustment circuit is further configured to:
   apply the first grid offset and the second grid offset to at least one pixel in each row of the plurality of rows to generate the adjusted grid for the plurality of pixels.

3. The image processing circuit of claim 1, wherein the first processor circuit is further configured to:
   determine the first grid offset along the first direction as a sum of the first offset and an interpolation value that is a function of a coordinate of that row of pixels along the first direction.

4. The image processing circuit of claim 3, wherein the first processor circuit is further configured to:
   determine an interpolation value based on an interpolation of a corresponding value from a look-up table in accordance with an interpolation function and the coordinate of that row of pixels along the second direction.

5. The image processing circuit of claim 4, wherein the interpolation function is a bilinear interpolation function.

6. The image processing circuit of claim 1, wherein the second processor circuit is configured to:
   combine the second offset and an interpolation value that is a function of the coordinate of that row of pixels along the second direction; and
   adjust the second grid offset along the second direction based on a combination of the second grid offset and the interpolation value.

7. The image processing circuit of claim 6, wherein the second processor circuit is further configured to:
   determine the interpolation value based on an interpolation of a corresponding value from a look-up table in accordance with an interpolation function and the coordinate of that row of pixels along the second direction.

8. The image processing circuit of claim 1, wherein, to scale the second grid offset, the grid adjustment circuit is further configured to:
   scale the second grid offset by a scaling factor that is based on a number of that row of pixels along the second direction.

9. The image processing circuit of claim 1, wherein the grid adjustment circuit is further configured to:
   perform lens shading correction processing of the plurality of pixels using a gain interpolation as a function of the adjusted grid.

10. The image processing circuit of claim 1, wherein the grid adjustment circuit is further configured to:
    determine a gain value for each pixel of the plurality of pixels based on an interpolation of a value from a gain look-up table in accordance with an interpolation function and coordinates of that pixel updated with the first grid offset and the second grid offset; and
    apply the gain value to at least one color component of that pixel to obtain a version of the image corrected for lens shading.

11. A method for processing an image having a plurality of pixels organized in a plurality of rows captured through an image sensor receiving light through a lens, the method comprising:
    obtaining a first offset for an optical center of the lens along a first direction and a second offset for the optical center along a second direction orthogonal to the first direction;
    determining, for each row of the plurality of rows of the image, a first grid offset along the first direction based on the first offset and a coordinate of that row of pixels along the second direction;
    determining, for each row of the plurality of rows of the image, a second grid offset along the second direction based on the second offset and the coordinate of that row of pixels along the second direction;
scaling the second grid offset; and
generating an adjusted grid for the plurality of pixels based on the first grid offset and the scaled second grid offset.

12. The method of claim 11, further comprising:
applying the first grid offset and the second grid offset to at least one pixel in each row of the plurality of rows to generate the adjusted grid for the plurality of pixels; and
performing lens shading correction processing of the plurality of pixels using a gain interpolation as a function of the adjusted grid.

13. The method of claim 11, further comprising:
determining an interpolation value based on an interpolation of a corresponding value from a look-up table in accordance with an interpolation function and the coordinate of that row of pixels along the second direction; and
determining the first grid offset along the first direction as a sum of the first offset and the interpolation value.

14. The method of claim 11, further comprising:
combining the second offset and an interpolation value that is a function of the coordinate of that row of pixels along the second direction; and
adjusting the second grid offset along the second direction based on a combination of the second grid offset and the interpolation value.

15. The method of claim 14, further comprising:
determining the interpolation value based on an interpolation of a corresponding value from a look-up table in accordance with an interpolation function and the coordinate of that row of pixels along the second direction.

16. The method of claim 11, wherein scaling the second grid offset comprises:
scaling the second grid offset by a scaling factor that is based on a number of that row of pixels along the second direction.

17. The method of claim 11, further comprising:
determining a gain value for each pixel of the plurality of pixels based on an interpolation of a value from a gain look-up table in accordance with an interpolation function and coordinates of that pixel updated with the first grid offset and the second grid offset; and
applying the gain value to at least one color component of that pixel to obtain a version of the image corrected for lens shading.

18. A device, comprising:
an image sensor configured to capture an image that includes a plurality of pixels organized in a plurality of rows;
a lens having an optical center with a first offset along a first direction and a second offset along a second direction orthogonal to the first direction;
an optical compensation circuit configured to:
determine, for each row of the plurality of rows of the image, a first grid offset along the first direction based on the first offset and a coordinate of that row of pixels along the second direction,
determine, for each row of the plurality of rows of the image, a second grid offset along the second direction based on the second offset and the coordinate of that row of pixels along the second direction,
generate an adjusted grid for the plurality of pixels based on the first grid offset and the second grid offset, and
update the coordinates for each pixel of the plurality of pixels based on the adjusted grid; and
a lens shading correction circuit configured to apply a gain value to each pixel based on the updated coordinates.

19. The device of claim 18, wherein:
the optical compensation circuit is further configured to apply the first grid offset and the second grid offset to at least one pixel in each row of the plurality of rows to generate the adjusted grid for the plurality of pixels, and
the lens shading correction circuit is further configured to perform lens shading correction processing of the plurality of pixels using a gain interpolation as a function of the adjusted grid.

20. The device of claim 18, wherein the optical compensation circuit is further configured to:
determine a first interpolation value based on an interpolation of a corresponding value from a first look-up table in accordance with a first interpolation function and a coordinate of that row of pixels along the first direction;
adjust the first grid offset along the first direction based on a combination of the first offset and the first interpolation value;
determine a second interpolation value based on an interpolation of a corresponding value from a second look-up table in accordance with a second interpolation function and the coordinate of that row of pixels along the second direction; and
adjust the second grid offset along the second direction based on a combination of the second offset and the second interpolation value.

* * * * *